INVENTOR
James B. Williamson
BY
Charles H. Bassett
ATTORNEY

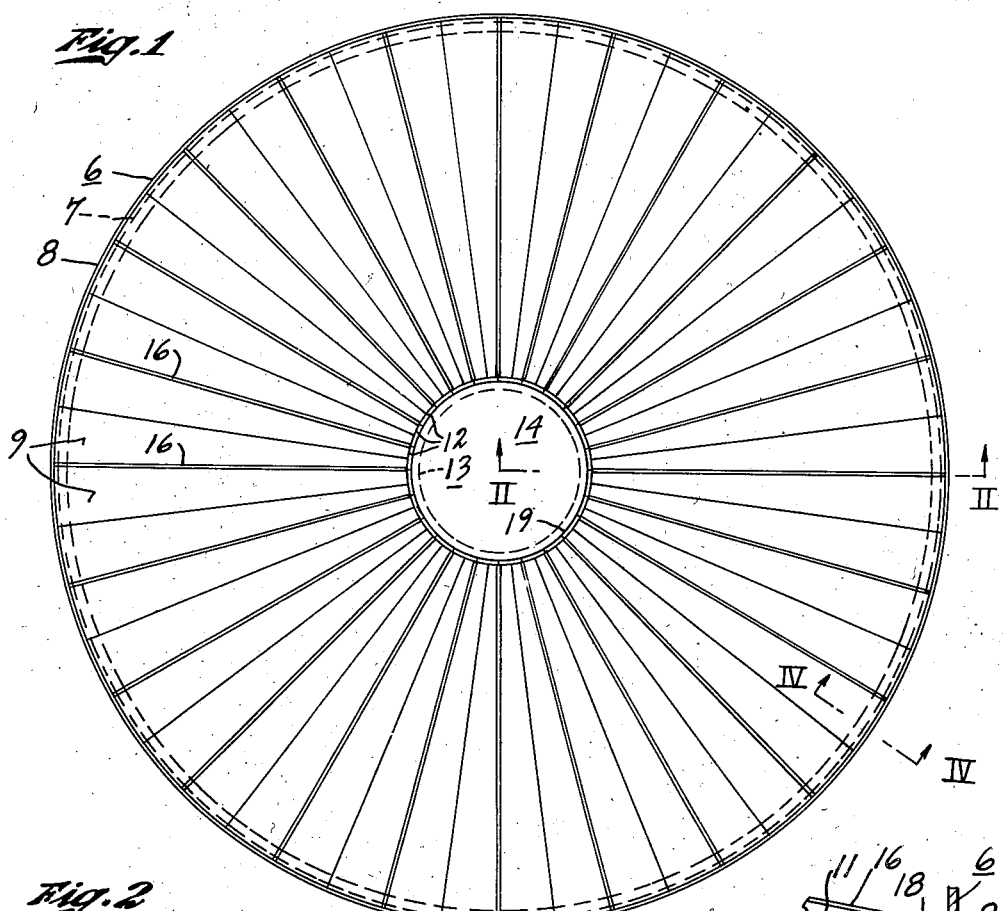
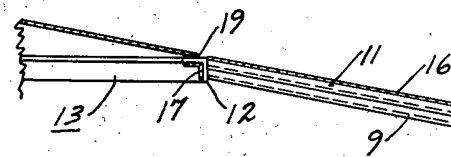
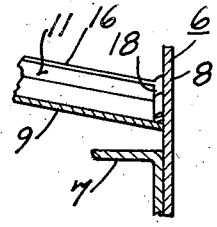
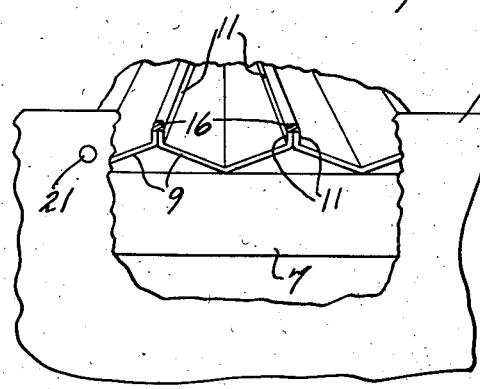
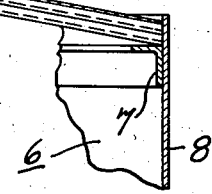
INVENTOR
James B. Williamson
BY
Charles H. Bassett
ATTORNEY March 9, 1937.  J. B. WILLIAMSON  2,073,358
SELF SUPPORTING TANK ROOF
Filed March 22, 1935   3 Sheets-Sheet 2
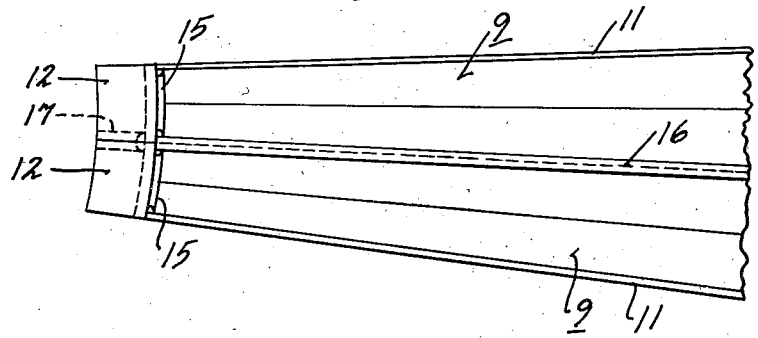
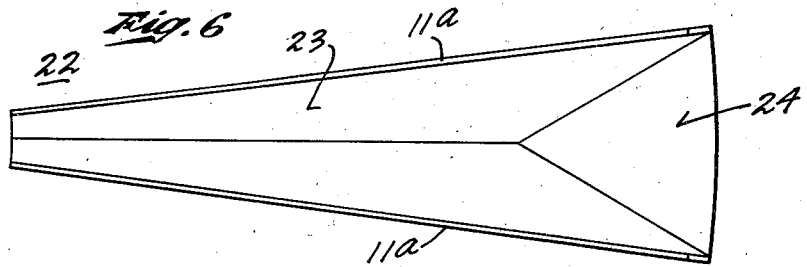
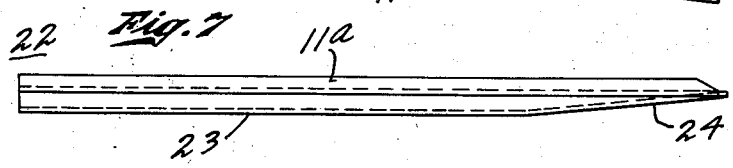
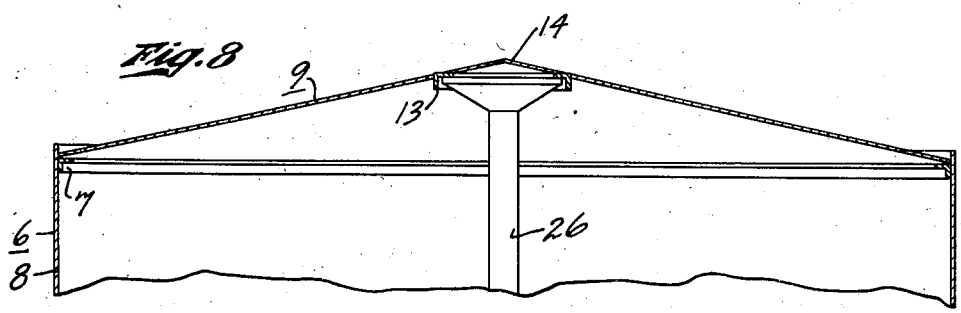
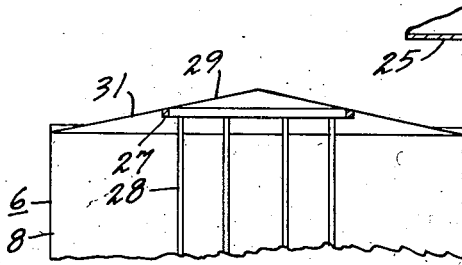
INVENTOR
James B. Williamson
BY
Charles H. Bassett
ATTORNEY March 9, 1937.　　　J. B. WILLIAMSON　　　2,073,358
SELF SUPPORTING TANK ROOF
Filed March 22, 1935　　　3 Sheets-Sheet 3

Patented Mar. 9, 1937

2,073,358

UNITED STATES PATENT OFFICE

2,073,358

SELF-SUPPORTING TANK ROOF

James B. Williamson, Birmingham, Ala.

Application March 22, 1935, Serial No. 12,406

7 Claims. (Cl. 108—32)

My invention relates to roofs for tanks and to methods of constructing same and more particularly to tanks of relatively large diameter provided with self-supporting roofs. While small diameter tanks have been provided with self-supporting roofs, large tank roofs have heretofore embodied columns and supporting beams to bear the weight of the roof and to resist the bending and compressive forces therein. My invention contemplates the provision of a cone-shaped roof for tanks of large diameter in which the roofing plates are designed and arranged to adequately withstand the bending and compressive forces without the use of additional reinforcing members.

My invention further contemplates the provision of a plurality of units, formed segmental in shape, arranged side by side about the periphery of the tank and welded to each other along their side edges to form a strong, solid, one-piece roof.

My invention further contemplates improved methods for constructing and assembling roofs. By constructing and assembling roofs in accordance with the hereinafter described methods, they can be rendered capable of withstanding greater bending and compressive forces than other roofs of the same weight and diameter known to me. My improved methods also result in a great saving in labor, material, and time consumed in forming the parts in the shop and assembling in the field.

My invention contemplates the provision of other novel features and details of construction which are hereinafter set forth in the specification and shown in the accompanying drawings forming part thereof.

Briefly, my invention comprises a cone-shaped roof formed of a plurality of similar units, segmental in shape, disposed side by side about the periphery of a tank and welded or otherwise secured to each other along their side edges. In order to facilitate welding the units to each other, I preferably form them with upturned flanges extending along their sides for engagement with complementary flanges on adjacent units. The units terminate near the apex of the roof, leaving an opening in which is mounted a compression ring adapted to be formed in one or more pieces and welded to the units. Each of the units is formed trough-shaped in cross section throughout part or all of its length to withstand bending and compressive forces in use and distortion during the welding assembly, but in tanks one-hundred feet in diameter it is desirable to employ columns as hereinafter shown and for the reasons set forth in the description thereof. A suitable cover is provided to cover the opening defined by the center or compression ring and may be welded or otherwise secured to same.

Roofs embodying features of my invention are illustrated in the accompanying drawings, forming part of this application, in which:

Fig. 1 is a plan view of a tank embodying my improved roof;

Fig. 2 is an enlarged sectional view taken along the line II—II of Fig. 1;

Fig. 3 is an enlarged fragmentary view of the upper portion of a tank, part of which has been broken away to show the outer ends of the roof units resting on a supporting ring secured to the inner wall of the tank;

Fig. 4 is an enlarged section view taken along the line IV—IV of Fig. 1;

Fig. 5 is an enlarged detail view showing the upper ends of two roof units;

Figs. 6 and 7 are plan and side elevational views, respectively, of a modified form of roof unit;

Fig. 8 is a cross sectional view of a tank in which a centrally disposed column is secured to the roof and to the bottom of the tank;

Fig. 9 is a diagrammatic sectional view illustrating a modified form of column support for the roof;

Figure 10:
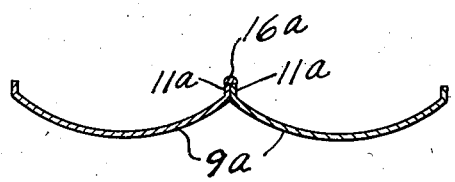
Figure 14:
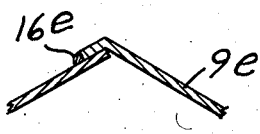
Figure 11:
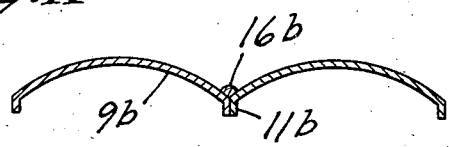
Figure 15:
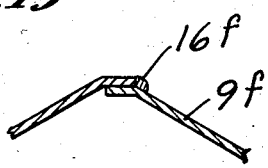
Figure 12:
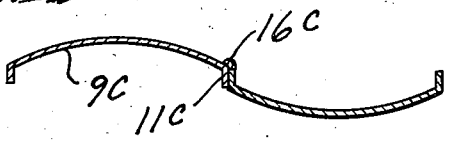
Figure 16:
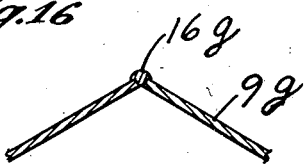
Figure 13:
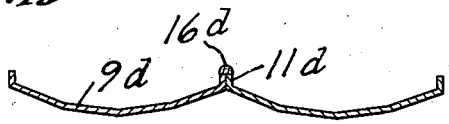
Figure 17:
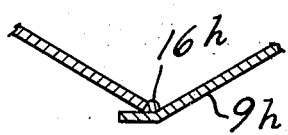
Figure 18:
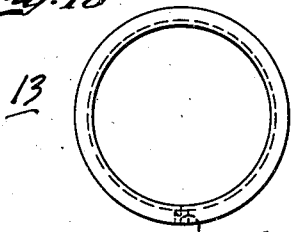
Figure 20:
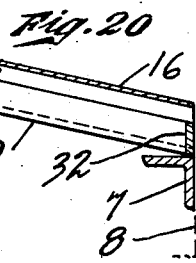
Figure 21:
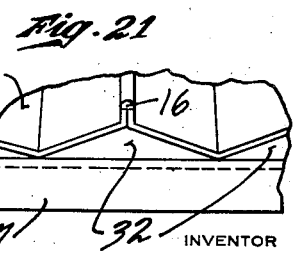
Figure 19:
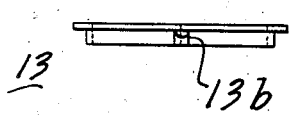

Figs. 10 to 13, inclusive, are transverse section views of modified forms of roof units;

Figs. 14 to 17, inclusive, are detail sectional views of modified forms of roof units, showing various ways in which they can be formed and secured to each other along their side edges;

Figs. 18 and 19 are plan and elevational views, respectively, of a compression ring formed in one piece;

Fig. 20 is a detail sectional view of the outer end of a modified form of roof unit; and Fig. 21 is an end view of same.

Referring now to the drawings for a better understanding of my invention, and more particularly to Figs. 1 to 5, I show a tank 6 provided with a roof supporting flange 7 which may be secured to the tank wall 8 in any suitable manner. My improved roof comprises a plurality of similar roof units 9 formed with upturned side flanges 11 radially disposed about roof. These roof units are formed of relatively light material and are trough-shaped to resist bending and compressive forces. It will be observed in the drawings that the roof units terminate a short distance away from the apex of the roof and define a central opening in which I provide a center supporting or compression ring 13. My preferred form of compression ring is composed of a number of short sections of angle iron 12 which abut and are secured to the ends of the roof units at 15 and to each other at 17, as shown in Fig. 5. A suitable cover 14, which may be either cone-shaped or flat, is provided to close the opening at the apex of the roof.

In the assembly of my improved roof, as shown in Figs. 1 to 5, the plates or roof units 9 are positioned at the designed roof pitch having their outer ends resting on the supporting flange 7 and their inner ends mounted on a centrally disposed support, such as the column 26 shown in Fig. 8 and which may be removed after the roof has been assembled. The roof units are adapted to engage each other tightly along their side edges, and are continuously welded to each other along the upper edges of the flanges 11 at 16. The sections of angle iron 12, forming the compression ring 13, are then welded to each other at 17, and the outer ends of the roof units 9 are continuously welded to the inside of the tank wall at 18. The cover 14 may then be secured to the compression ring 13, as by welding at 19, to complete the assembly of the roof. Openings 21 may be provided in the wall of the tank to permit the escape of rain water.

In Figs. 6 and 7, I show a modified form of roof unit 22 provided with a trough portion 23 which merges into a flat surface portion 24 near the outer end of the unit to facilitate welding same to the wall of the tank.

While the roof illustrated in Figs. 1 to 5 is capable of resisting bending and compressive forces in sizes approaching eighty feet in diameter without column and girder supports, it is desirable in larger sizes to provide a centrally disposed supporting column 26, as shown in Fig. 8, to release the roof units of compressive forces. It is also desirable to provide this column support in smaller diameter tanks if they are to be subjected to great variations in internal pressure, in which event the column is secured to the center ring 13 and also to the bottom 25 of the tank. As hereinbefore set forth, it is necessary in assembling the roof to support the inner ends of the roof units until they have been secured together, after which it may at times be expedient to leave the support in position rather than undertake the removal of same.

In Fig. 9, I have illustrated diagrammatically a roof supported on a circular girder 27 and columns 28. This form of support is desirable in very large tanks; that portion of the roof above the girder at 29 being self-supporting and subjected to compressive forces, while the lower portion of the roof below the girder at 31 is supported and free of compressive forces.

In Figs. 10 to 13, inclusive, I show several different forms of trough-shaped roof units 9a, 9b, 9c, and 9d, respectively; all of which are provided with flanges 11a, 11b, 11c, and 11d, respectively; and welded to each other on their upper side and along their juncture at 16a, 16b, 16c, and 16d, respectively.

In Figs. 14 to 17, inclusive, I show four ways in which the roof units 9e, 9f, 9g, and 9h, respectively, may be formed and welded to each other along their side edges at 16e, 16f, 16g, and 16h, respectively.

Figs. 18 and 19 illustrate a compression ring formed of one piece of angle iron and having its ends welded together at 13b.

Figs. 20 and 21 show a modified form of construction in which the supporting ring 7 is positioned at the top edge of the tank wall 8, and the opening defined by the roof units and supporting ring is closed by means of a triangular-shaped plate 32 welded thereto.

While I have shown my invention in several forms, it is obvious to those skilled in this art that it is not so limited, but is susceptible of various changes and modifications without departing from the spirit thereof; and I desire, therefore, that only such limitations shall be placed thereupon as are imposed by the prior art.

I claim:

1. In a roof for circular tanks, a plurality of roof units radially disposed with respect to the axis of the tank, each unit being trough shaped in cross section, flanges provided along the sides of the roof units, continuous weld joints connecting adjoining flanges to each other, and a compression ring secured to the inner ends of the roof units.

2. A roof according to claim 1 in which, the roof units are formed arcuate in cross section through part of their length and with a flat portion at their outer ends.

3. In a roof for a circular tank, a plurality of roof units radially disposed with respect to the axis of the tank, each unit being trough shaped in cross section, upturned flanges provided along the sides of the roof units, continuous weld joints connecting adjoining flanges to each other, compression ring segments secured to the inner ends of the roof units, and means to connect the compression ring segments to each other.

4. In a roof for a circular tank, a plurality of roof units radially disposed with respect to the axis of the tank, each unit being trough shaped in cross section, upturned flanges provided along the sides of the roof units, continuous weld joints connecting adjoining flanges to each other, center supporting ring segments secured to the inner ends of the roof units, means connecting the ring segments to each other, and means for connecting the inner ends of the unit to the tank wall.

5. In a roof for a circular tank, a plurality of roof units radially disposed with respect to the axis of the tank, said roof units being trough shaped in cross section, and continuous weld joints connecting adjoining roof units to each other.

6. In a roof for a circular tank, a plurality of roof units radially disposed with respect to the axis of the tank, said units being trough-shaped in cross section, continuous weld joints connecting adjoining roof units to each other, and a center ring secured to the inner ends of the roof units.

7. In a roof for a circular tank, a plurality of roof units radially disposed with respect to the axis of the tank, said units being trough-shaped in cross section, continuous weld joints for connecting adjoining roof units to each other, a center ring secured to the inner ends of the roof units, and a cover secured to the center ring.

JAMES B. WILLIAMSON.